UNITED STATES PATENT OFFICE.

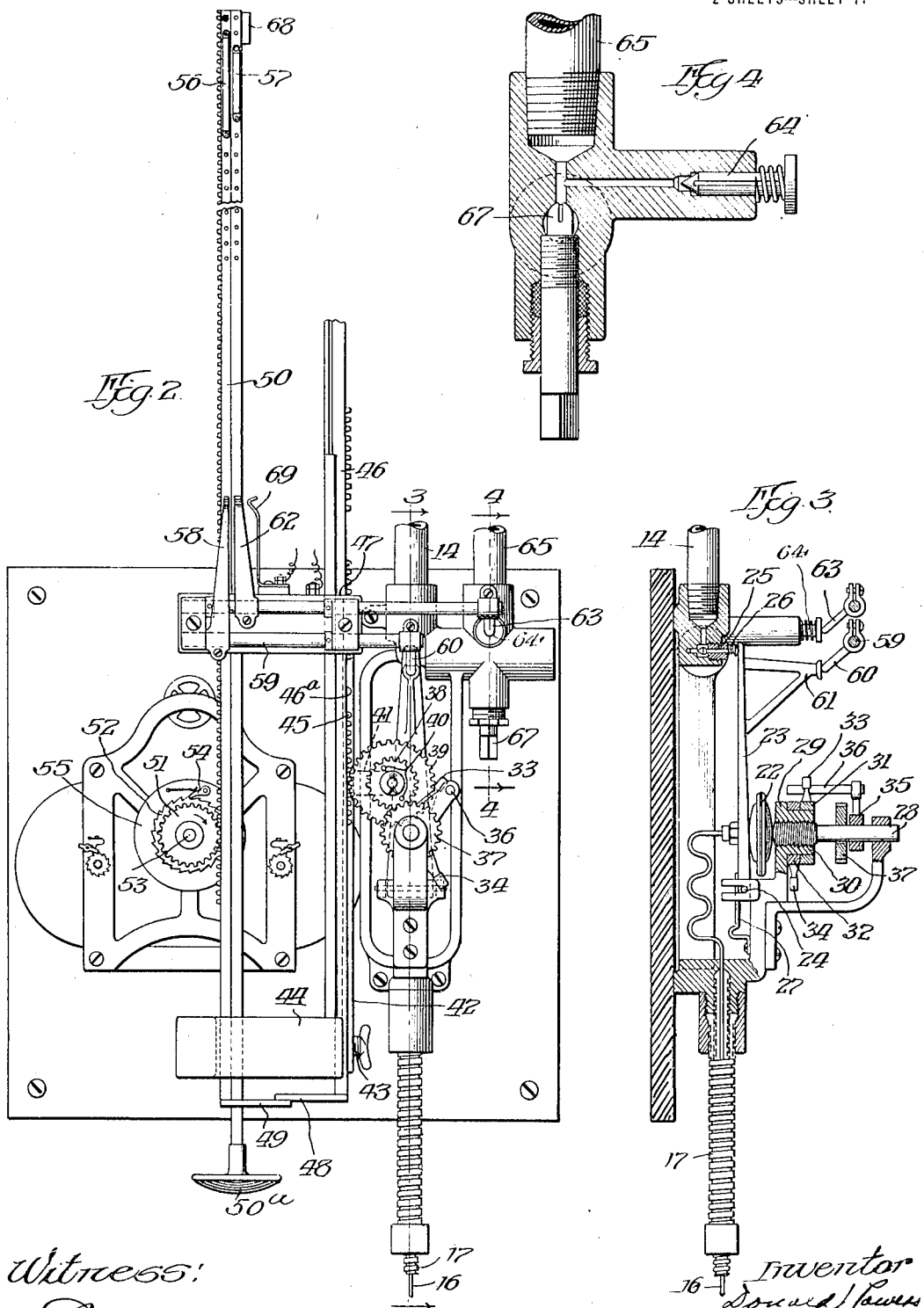

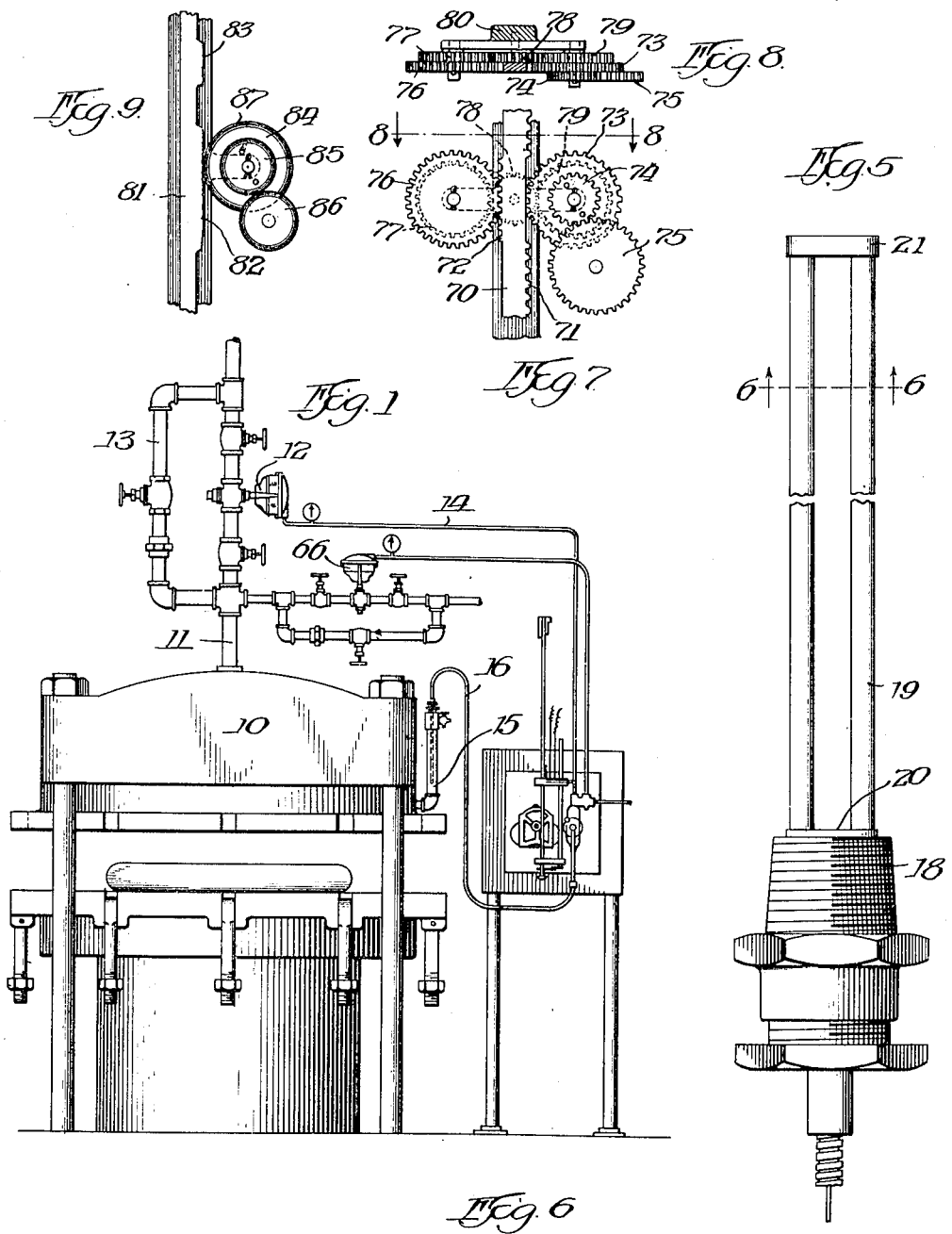

DONALD J. POWERS, OF DOBBS FERRY, NEW YORK, ASSIGNOR TO THE POWERS REGULATOR COMPANY, OF CHICAGO, ILLINOIS, A CORPORATION OF ILLINOIS.

TIME-GOVERNED REGULATOR.

1,286,096.  Specification of Letters Patent.  Patented Nov. 26, 1918.

Application filed July 19, 1917.  Serial No. 181,457.

*To all whom it may concern:*

Be it known that I, DONALD J. POWERS, a citizen of the United States, and resident of Dobbs Ferry, in the county of Westchester and State of New York, have invented certain new and useful Improvements in Time-Governed Regulators, of which the following is a specification.

My invention relates to heat regulating devices and particularly to a novel time-controlled heat regulator.

My invention is applicable to many different forms of heat-applying devices. It is illustrated in connection with a tire vulcanizing apparatus. In the process of vulcanizing it is essential that exact temperatures shall be maintained for certain definite periods of time and this apparatus is designed to eliminate the human element from the control thereof. Under a certain condition it is necessary that the temperature in the vulcanizer shall be progressively increased to substantially 250° F., during a period of twenty minutes and that this temperature shall be accurately maintained for four hours' time, after which the heat is completely shut off. These temperatures and times govern the treatment of but one size of tire and therefore the device must be capable of adjustment to secure different temperatures at and during different times. For instance it is necessary in the treatment of some tires or tubes to elevate the temperature to a certain point during a predetermined interval; to maintain such temperature for a certain period; then to reduce the temperature for a time; then to raise it and then to shut off the heat and inject a cooling medium.

There are many other branches of industry in which definite heat regulation during predetermined time intervals is necessary and this invention may readily be employed therein. The invention is in the form of a unit it being necessary for its application only to locate the heat sensitive element at a point at which heat is applied and to connect the valve-controlling device to a source of fluid pressure or other valve-controlling means.

I am well aware that thermostatic control of heat supply is old; also that time-controlled means have been associated therewith, with the object of beginning or terminating the supply of heat at a certain time. In my invention, however, the time-controlled element does not act directly on the valve which controls the supply of heat except when the heat is to be shut off. The graduations in the amount of heat are secured by acting on the thermostat. Thus a temperature control is effected which for all practical purposes is absolutely accurate.

The desired result is secured by placing in a heat-applying device a bulb or tube filled with a highly volatile fluid, connecting this bulb by a minute capillary tube to an expansible disk which in effect is in the form of a hollow capsule. This may be located at any desired distance from the point of heat application. The application of heat to the bulb or tube containing the volatile substance causes vaporization or expansion thereof; which serves to expand the capsule or hollow disk. The disk bears at one side on the valve lever which controls the supply of fluid pressure acting on the heat-supplying valve. The arrangement is such that the expansion of the hollow disk, due to increase of heat at the point of aplication, serves to close the fluid pressure valve and consequently to close the valve which controls the supply of heating fluid. In order to secure the desired adjustment of temperatures, the support or abutment for the disk on the side opposite to that on which it bears against the fluid pressure valve, is arranged for micrometric adjustment. This adjustment is effected by a clock. If it be desired to progressively increase the temperature during a certain period of time the threaded abutment is retracted by slow rotation, this rotation being continued during the desired period of time. The extent of adjustment and consequently the extent of change of temperature during that time is effected by the use of gears of different ratios.

Stops which limit the rotation of the support are fixed at the proper points and after the termination of the predetermined period the temperature will be maintained constant for any desired period. However, in the preferred arrangement means are provided which operate for a further time to effect other operations such as completely shutting off the supply of heating fluid, admitting a supply of cooling water and sounding an alarm, visually or audibly, to inform the attendant that the desired operations have been completed. All these latter steps are carried out without interference with the thermostatic element. The device is so arranged that a single movement by the operator is sufficient to re-set the apparatus for a repetition of the steps described.

The direct control of the temperature by the adjustment of the thermostat may be carried on through wide limits it being necessary only to change the ratios and arrangement of the time-operated rack and gears.

The invention will be more readily understood by reference to the accompanying drawings, wherein:

Figure 1 is a diagrammatic illustration showing the application of my improved device to a tire vulcanizer;

Fig. 2 is an enlarged front view of the regulator;

Fig. 3 is a sectional view on the line 3—3 of Fig. 2;

Fig. 4 is a sectional view on the line 4—4 of Fig. 2;

Fig. 5 is an elevation of the heat sensitive element;

Fig. 6 is a sectional view on the line 6—6 of Fig. 5;

Fig. 7 is a supplementary view of a modified form of thermostat adjusting means the parts being arranged to provide for lowering as well as raising the temperature;

Fig. 8 is a sectional view on the line 8—8 of Fig. 7, and,

Fig. 9 is a similar view showing a modified form of the construction shown in Fig. 2.

In the drawings the vulcanizer is indicated at 10. This device is illustrated merely as an example of one of the many uses to which the invention may be put. In this device steam is supplied through the pipe 11, controlled by a fluid-pressure valve 12. This valve is preferably of the reverse type—that is, it is maintained in open position by fluid-pressure. Therefore if the fluid-pressure fails the valve will be closed and the danger of overheating is avoided. A valve-controlled by-pass 13, may be provided around the valve 12, for independent control if desired. A fluid-pressure line 14, connects the valve 12, to the regulator, shown in Figs. 2 and 3. The heat sensitive element shown in Figs. 5 and 6, is inserted in a pipe 15, connected to the steam space of the vulcanizer. This element may be located at any desired point, but preferably in such manner that it will receive the actual temperature. A small capillary tube 16, connects the element to the regulator preferably through an armored cable 17. The heat sensitive element shown in Figs. 5 and 6 is of novel form and comprises a threaded head 18, and two flattened tubes 19, connected at each end by headers 20, 21. The tubes are composed of relatively thin gage metal. By flattening the tubes a thin body of heat sensitive fluid is maintained which is much more responsive to temperature variations than the same body of liquid in a round tube.

The small tube 16, is connected to a hollow disk or capsule 22, which bears at one side against an arm 23, pivoted at 24, and bearing at its opposite end upon a valve 25, which controls the passage of fluid-pressure from the source of supply to the pipe 14. A spring 26, normally holds the valve in open position. In this position fluid-pressure passes to the valve 12, and opens the same, permitting steam to pass to the vulcanizer. When the valve 25, is closed the pressure acting on the valve 12, is allowed to escape around the valve stem 25, and the supply of steam is interrupted. To prevent possible damage to the expansible disk 22, due to an abnormal pressure, the pivoted end of the arm 23, is held by a stiff spring 27. This permits an abnormal expansion of the disk after the valve 25 is closed.

The other side of the expansible disk is supported by a threaded shaft 28, the threaded end being accommodated within the threaded bearing 29, forming a part of the frame of the regulator. A hub 30, on the bearing surface, acts as a support for two stop collars 31, 32. Suitable means such as set screws (not shown) are provided for securing the collars in adjusted positions. Stops in the form of arms 33, 34, are provided on the collars, the space between the two stops defining the permissible rotation of the threaded shaft 28. This result is secured by providing an adjustable arm 35, on the shaft, a laterally extending pin 36, being engaged by the stops, as best shown in Fig. 2.

Movement of the shaft 28, is effected by a gear 37, fixed to the shaft, which gear engages with a gear 38, mounted on a second gear 39, and is rotatable therewith by reason of inter-engaging pins 40. The gear 39, is mounted on a bracket 41, rigid with a slide 42, which is guided in suitable ways and held in adjusted position by a thumb-screw 43, the latter engaging with a bracket 44.

The gear 39, is in mesh with a rack 45, formed as a part of the slide-bar 46, which is guided in suitable ways in the brackets 44, 47. A lateral extension 48, on the bottom of the bar 46, overlies a similar extension 49, on a long rack-bar 50. The latter bar is actuated by a pinion 51, rigid with a ratchet-wheel 52, which is loose on the shaft 53, of a clock. A pawl 54, mounted on a clock-rotated member 55, causes rotation of the ratchet and pinion. In normal operation the pinion rotates in a direction indicated by the arrow in Fig. 2, which moves the rack-bar downwardly or permits it to move downwardly under its own weight. The bar 46, likewise moves downwardly under its own weight to the extent permitted by the stop 34. When the bar 46, has rotated gears 39, 38 and 37, through the limit of movement as permitted by the stop 34, it will remain stationary, the bar 50, continuing its downward movement. When this point has been reached, the temperature will be maintained constant as no further change of adjustment of the thermostat will be made.

However, the bar 50, has other functions. For instance, I provide a pair of cams 56, 57, near the upper end thereof, means being provided for adjustably locating the same with relation to the length of the bar. The cam 56, serves to actuate an arm 58, which in turn rotates a shaft 59, carrying at one end a short arm 60, best shown in Fig. 3, which bears against a projection 61, on the arm 23. By this means the valve 25, is closed without operation of or acting upon the thermostatic adjustment. Thus the steam or other heating medium is shut off at the proper time.

When desired, the cam 57, is employed for admitting a supply of cooling medium. In that case an arm 62, is actuated by the cam 57, this arm rotating a shaft which in turn moves a short arm 63, best shown in Fig. 3, which serves to close a valve 64, shown in detail in Fig. 4. A pipe connection 65, from the valve member 64, communicates with a fluid-pressure valve 66, shown in Fig. 1, which controls the cold water supply. This valve operates similarly to the valve 12; that is, it is normally in closed position and under normal operations the supply of air which is admitted around the adjusting valve 67, is exhausted through the valve 64. When however, the valve 64, is actuated and closed by the cam 57, the air cannot escape and pressure accumulates in the valve 66, which opens the same and admits the cooling medium.

Further downward movement of the rack 50, serves to bring a contact member 68, into engagement with the contact 69, and closes a circuit whereby a bell is rung or a similar warning given that the cycle of operations has been completed.

When the described operations are to be repeated, the operator engages the button or knob 50ª, and pushes upward on the rack 50; the projections 48, 49, will come into contact and the rack bar 46, also moved upwardly the extent of movement being determined by the location of the stop 33. The upward movement of the rack 50, is permitted because of the pawl and ratchet 52, 54. The parts are then ready for a repetition of the heretofore described steps.

It will be noted that the first stages of the operation contemplates the elevation of the temperature through a period corresponding to the time necessary for the pin 36, to travel between the stops 33, 34. When the thermostat has been properly adjusted this temperature will be reached simultaneously with the completion of travel of the rack-bar 46. Therefore that temperature will be maintained for a period corresponding to the length of the rack-bar 50. If the desired temperature is to be reached during longer or shorter periods of time, the result may be secured by changing the gear ratios; that is, by removing the gear 38, and substituting a larger or a smaller gear. This controls the degree of acceleration. The period of time within which acceleration is to take place is controlled by the location of the stops 33, 34.

By omitting teeth in the rack-bar 46, as shown at 46ª, it is possible to raise the temperature to a predetermined point, then carry it for a desired time at that point, then further raise it. This may be controlled as desired by omitting teeth at intervals in the rack-bar.

As shown in Figs. 7 and 8, it is possible by a slight change to both raise and lower the temperature by opposite adjustments of the thermostat. The result is secured by providing a rack-bar 70, operated in the same manner as the rack-bar 46, and provided with rack-teeth 71, 72, on opposite sides thereof. The teeth 72, will be placed opposite an interruption in the teeth 71. The rack-teeth 71, actuate a gear 73, upon which is mounted a smaller gear 74, which meshes with the larger gear 75, in the same manner as illustrated in Fig. 2. The rack-teeth 72, engage with a pinion 76, which is secured to a gear 77. The latter gear meshes with an idler 78, which engages with a gear 79, secured to the gear 73. The gear 75, corresponding to the gear 37, in Fig. 2. By this means the temperature may be adjusted both upward and downward. When the ratio is to be changed a larger or smaller gear may be substituted for the gear 74, the support 80, on which all of the gears are mounted being vertically adjustable in the same manner as described in connection with the construction of Fig. 2.

It is possible that in some instances there may be an objection to the use of a rack and pinions where the rack-teeth are interrupted due to the possibility of failure of the pinion to properly engage with the rack after the interruption. The construction in Fig. 9 is designed to obviate this difficulty. In that construction the bar 81, has no rack-teeth. The raised portions 82, 83, are merely serrated or roughened and the gears 84, 85, 86, are in the form of disks having soft rubber peripheries 87. By constructing the parts in such manner the danger referred to is obviated. This idea may be adapted to the construction shown in Fig. 7 to advantage.

It will be noted that all the temperature variations are secured by adjusting the thermostat instead of directly acting on the valve which controls the heating fluid. By the means here disclosed a much finer adjustment can be secured; in fact, the desired temperatures may be secured within very narrow limits.

It is a well known fact that the temperature of steam is a function of its pressure. In the use of steam for heating therefore it is possible to employ an expansible element which is acted upon directly by the steam. In that case there would be an open connection between the steam chest or jacket and the hollow disk.

I claim:

1. A thermostatic control including a clock, a reciprocable element operated by the clock, an expansible element, a fluid-pressure valve controlled by said expansible element, an abutment for one side of said expansible element, and means operable by said reciprocating element for moving said abutment relative to said expansible element whereby the adjustment of the thermostat is affected, substantially as described.

2. A time-controlled heat regulator comprising in combination, a heat controlling valve, fluid-pressure means for controlling said valve, a second valve for controlling the fluid-pressure whereby said first valve is opened and closed, a thermostatically controlled expansible disk acting on said second valve, a screw-advanced abutment for the other side of said disk, and clock controlled means acting on said screw-advanced abutment for changing the permissible space to be occupied by said disk, substantially as described.

3. A time-controlled heat regulator comprising, in combination, a heat-controlling valve, fluid-pressure means for controlling said valve, a second valve for controlling the fluid-pressure whereby said first valve is opened and closed, an arm for acting upon said second valve, an abutment adjacent to said arm, a thermostatically expansible element between said abutment and arm, clock-controlled means for moving said abutment, and means for changing the relative movement between the clock and said abutment to secure different degrees of adjustment in the same period of time, substantially as described.

4. In a device of the class described, the combination of a fluid-pressure valve, a thermostatically expansible element for controlling said valve, a movable support for said element, a screw for advancing and retracting said support, stops for limiting the extent of movement of said screw, and clock-controlled means for moving said screw between the limit stops during a predetermined time, substantially as described.

5. In a device of the class described, the combination of a fluid-pressure valve, a thermostatically expansible element for controlling said valve, a movable support for said element, screw means for advancing and retracting said support, stops for controlling the extent of movement of said support, a clock for actuating said screw means, and means for changing the relative movement between the clock and the screw whereby to effect the permissible adjustment of said support during different periods of time, substantially as described.

6. In a device of the class described, the combination of a fluid-pressure valve, a thermostatically expansible element for controlling said valve, a movable support for said element, limit stops for fixing the extent of movement of said support, clock-controlled means for effecting movement of the support within the limits defined by the stops whereby progressive adjustment of the thermostatic element is secured during a predetermined period, and means for changing the adjustment of the stops whereby to change the period of time during which adjustment takes place, substantially as described.

7. In a device of the class described, the combination of a fluid-pressure valve, a thermostatically expansible element for controlling said valve, a movable support for said element, a screw for advancing said support, a gear for actuating said screw, and a clock-controlled rack for actuating said gear, substantially as described.

8. In a temperature regulator, the combination of a fluid-pressure valve, a thermostatically expansible disk for actuating said valve, a screw acting as an abutment or support for said disk, stops for limiting the adjustment of said screw, a rack and gear for moving said screw between the limit stops, and a clock for controlling the movement of said rack, substantially as described.

9. In a temperature regulator, the combination of a fluid-pressure valve, an expansible disk for actuating said valve, an adjustable abutment for said disk, a clock-controlled rack for effecting movement of said abutment during a predetermined period, and independent means operable by said clock for actuating said valve, substantially as described.

Signed at Chicago, Illinois, this 13th day of July, 1917.

DONALD J. POWERS.

Witness:
  T. D. BUTLER.